(12) United States Patent (10) Patent No.: US 11,128,412 B2
Qin et al. (45) Date of Patent: Sep. 21, 2021

(54) INFORMATION TRANSMISSION METHOD AND COMMUNICATIONS DEVICE

(71) Applicant: HUAWEI TECHNOLOGIES CO., LTD., Guangdong (CN)

(72) Inventors: Yi Qin, Kista (SE); Zhongfeng Li, Munich (DE); Yi Ren, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 16/581,557

(22) Filed: Sep. 24, 2019

(65) Prior Publication Data

US 2020/0021404 A1 Jan. 16, 2020

Related U.S. Application Data

(63) Continuation of application No. PCT/CN2018/080087, filed on Mar. 22, 2018.

(30) Foreign Application Priority Data

Mar. 24, 2017 (CN) .......................... 201710184914.1

(51) Int. Cl.
*H04L 5/00* (2006.01)
*H04W 72/04* (2009.01)
*H04W 72/12* (2009.01)

(52) U.S. Cl.
CPC .......... *H04L 5/0005* (2013.01); *H04L 5/0039* (2013.01); *H04L 5/0092* (2013.01);
(Continued)

(58) Field of Classification Search
CPC ..... H04L 5/0005; H04L 5/001; H04L 5/0039; H04L 5/0053; H04L 5/0092; H04L 5/14;
(Continued)

(56) References Cited

U.S. PATENT DOCUMENTS 6,014,374 A 1/2000 Paneth et al.
6,728,326 B1 4/2004 Fulghum
(Continued)

FOREIGN PATENT DOCUMENTS

CN 101729125 A 6/2010
CN 101754230 A 6/2010
(Continued)

OTHER PUBLICATIONS

Extended European Search Report issued in European Application No. 18771235.5 dated Feb. 18, 2020, 9 pages.
(Continued)

*Primary Examiner* — Wutchung Chu
(74) *Attorney, Agent, or Firm* — Fish & Richardson P.C.

(57) ABSTRACT

This application provides an information transmission method and a communications device. A first communications device sends first indication information to a second communications device, where the first indication information indicates a frequency resource used by the second communications device to send data in a time unit and a frequency resource used by the second communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain. In the foregoing information transmission method, the first communications device can flexibly allocate the frequency resources based on a network requirement, thereby improving resource utilization.

14 Claims, 10 Drawing Sheets

(52) U.S. Cl.
CPC ... *H04W 72/0446* (2013.01); *H04W 72/0453* (2013.01); *H04W 72/1263* (2013.01); *H04W 72/1278* (2013.01)

(58) Field of Classification Search
CPC ............ H04L 5/1469; H04W 72/0406; H04W 72/0453; H04W 72/1278; H04W 72/0446; H04W 72/1263
See application file for complete search history.

(56) References Cited

U.S. PATENT DOCUMENTS

| | | | | |
|---|---|---|---|---|
| 8,824,355 | B2* | 9/2014 | Takano | H04B 7/15557 370/315 |
| 8,982,864 | B2* | 3/2015 | Takano | H04W 72/04 370/341 |
| 9,538,534 | B2* | 1/2017 | Mizusawa | H04W 72/12 |
| 10,623,151 | B2* | 4/2020 | Kim | H04J 11/00 |
| 10,856,325 | B2* | 12/2020 | Kim | H04W 74/0833 |
| 10,893,522 | B2* | 1/2021 | Tang | H04L 5/1469 |
| 2001/0043572 | A1 | 11/2001 | Bilgic et al. | |
| 2005/0085214 | A1* | 4/2005 | Laroia | H04L 5/0048 455/403 |
| 2009/0249153 | A1* | 10/2009 | Zhang | H04W 72/04 714/748 |
| 2011/0267996 | A1* | 11/2011 | Guan | H04W 72/042 370/280 |
| 2012/0218964 | A1* | 8/2012 | Park | H04B 7/155 370/329 |
| 2013/0039261 | A1* | 2/2013 | Bi | H04W 72/0426 370/315 |
| 2013/0301570 | A1* | 11/2013 | Xu | H04W 72/0426 370/329 |
| 2015/0009873 | A1* | 1/2015 | Liu | H04L 5/1469 370/280 |
| 2015/0071133 | A1* | 3/2015 | Li | H04W 72/1278 370/278 |
| 2015/0271790 | A1* | 9/2015 | Lee | H04W 72/042 455/450 |
| 2017/0048883 | A1 | 2/2017 | Guan et al. | |
| 2018/0248662 | A1* | 8/2018 | Kim | H04L 5/143 |
| 2019/0075561 | A1* | 3/2019 | Tang | H04W 72/0453 |
| 2019/0141711 | A1* | 5/2019 | Fu | H04W 72/042 |
| 2019/0223023 | A1* | 7/2019 | Altay | H04W 4/50 |
| 2019/0281610 | A1* | 9/2019 | Choi | H04L 5/0035 |
| 2020/0028640 | A1* | 1/2020 | Yeo | H04L 5/005 |
| 2020/0037292 | A1* | 1/2020 | Oh | H04W 72/1268 |

FOREIGN PATENT DOCUMENTS

| | | |
|---|---|---|
| CN | 102186251 A | 9/2011 |
| CN | 102624507 A | 8/2012 |
| CN | 103368684 A | 10/2013 |
| CN | 103686866 A | 3/2014 |
| CN | 105338634 A | 2/2016 |
| CN | 105764144 A | 7/2016 |
| EP | 0847213 A2 | 6/1998 |
| EP | 2408138 A2 | 1/2012 |
| EP | 2360984 B1 | 7/2018 |
| WO | 2009149565 A1 | 12/2009 |
| WO | 2014078981 A1 | 5/2014 |
| WO | 2016090370 A1 | 6/2016 |

OTHER PUBLICATIONS

PCT International Search Report and Written Opinion issued in International Application No. PCT/CN2018/080087 dated May 30, 2018, 13 pages. (with English translation).
Office Action issued in Chinese Application No. 201710184914.1 dated Mar. 29, 2021, 8 pages.
EPO Communication pursuant to Article 94(3) EPC issued in European Application No. 18771238.5 dated Feb. 26, 2021, 7 pages.

* cited by examiner

INFORMATION TRANSMISSION METHOD AND COMMUNICATIONS DEVICE

CROSS-REFERENCE TO RELATED APPLICATIONS

This application is a continuation of International Application No. PCT/CN2018/080087, filed on Mar. 22, 2018, which claims priority to Chinese Patent Application No. 201710184914.1, filed on Mar. 24, 2017, The disclosures of the aforementioned applications are hereby incorporated by reference in their entireties.

TECHNICAL FIELD

This application relates to the field of communications technologies, and in particular, to an information transmission method and a communications device.

BACKGROUND

A frequency resource use manner is preset in a long term evolution (Long Term Evolution, LTE) system or a Long Term Evolution-Advanced (Long Term Evolution-Advanced, LTE-A) system. In a time division duplex (Time Division Duplex, TDD) scenario, a network side may send uplink-downlink configuration information to a terminal, to indicate a subframe used for uplink transmission and a subframe used for downlink transmission. In this frequency resource use manner, frequency resource utilization is relatively low.

SUMMARY

This application provides an information transmission method and a communications device, to improve frequency resource utilization.

According to a first aspect, an information transmission method is provided and includes:

sending, by a first communications device, first indication information to a second communications device, where the first indication information indicates a frequency resource used by the second communications device to send data in a time unit and a frequency resource used by the second communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

In the foregoing solution, the first communications device can flexibly allocate the frequency resources based on a network requirement, thereby improving resource utilization.

With reference to the first aspect, in a first possible implementation, the method further includes: sending, by the first communications device, second indication information to the second communications device, where the second indication information indicates time domain information of the time unit.

With reference to the first aspect or the first possible implementation of the first aspect, in a second possible implementation, the first indication information indicates frequency domain location information of the frequency resource used to send data and frequency domain location information of the frequency resource used to receive data.

With reference to the second possible implementation of the first aspect, in a third possible implementation, the frequency domain location information includes at least one of the following information: information about a lowest frequency of the frequency resource used to send data, information about a lowest frequency of the frequency resource used to receive data, information about a highest frequency of the frequency resource used to send data, and information about a highest frequency of the frequency resource used to receive data.

With reference to the first aspect or the first possible implementation of the first aspect, in a fourth possible implementation, the first indication information indicates bandwidth of the frequency resource used to send data or bandwidth of the frequency resource used to receive data.

With reference to the first aspect or the first possible implementation of the first aspect, in a fifth possible implementation, the first indication information indicates a ratio of bandwidth of the frequency resource used to send data to bandwidth of the frequency resource used to receive data.

With reference to any one of the first aspect or the possible implementations of the first aspect, in a sixth possible implementation, the frequency band includes a guard band.

With reference to the sixth possible implementation of the first aspect, in a seventh possible implementation, the method further includes: sending, by the first communications device, third indication information to the second communications device, where the third indication information includes information about a frequency domain unit of the guard band, and the frequency domain unit is a subcarrier, a resource block RB, a resource block group RBG, an RB set, an RBG set, or a component carrier CC.

According to the first aspect, for example, the first communications device may be a base station, a relay, or a terminal. The second communications device may be a base station, a relay, or a terminal.

According to a second aspect, an information transmission method is provided and includes:

receiving, by a first communications device, first indication information from a second communications device, where the first indication information indicates a frequency resource used by the first communications device to send data in a time unit and a frequency resource used by the first communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

In the foregoing solution, the second communications device can flexibly allocate the frequency resources based on a network requirement, thereby improving resource utilization.

With reference to the second aspect, in a first possible implementation, the method further includes: receiving, by the first communications device, second indication information from the second communications device, where the second indication information indicates time domain information of the time unit.

With reference to the second aspect or the first possible implementation of the second aspect, in a second possible implementation, the first indication information indicates frequency domain location information of the frequency resource used to send data and frequency domain location information of the frequency resource used to receive data.

With reference to the second possible implementation of the second aspect, in a third possible implementation, the frequency domain location information includes at least one of the following information:

information about a lowest frequency of the frequency resource used to send data, information about a lowest frequency of the frequency resource used to receive data, information about a highest frequency of the frequency resource used to send data, and information about a highest frequency of the frequency resource used to receive data.

With reference to the second aspect or the first possible implementation of the second aspect, in a fourth possible implementation, the first indication information indicates bandwidth of the frequency resource used to send data or bandwidth of the frequency resource used to receive data.

With reference to the second aspect or the first possible implementation of the second aspect, in a fifth possible implementation, the first indication information indicates a ratio of bandwidth of the frequency resource used to send data to bandwidth of the frequency resource used to receive data.

With reference to any one of the second aspect or the possible implementations of the second aspect, in a sixth possible implementation, the frequency band includes a guard band.

With reference to the sixth possible implementation of the second aspect, in a seventh possible implementation, the method further includes: receiving, by the first communications device, third indication information from the second communications device, where the third indication information includes information about a frequency domain unit of the guard band, and the frequency domain unit is a subcarrier, a resource block RB, a resource block group RBG, an RB set, an RBG set, or a component carrier CC.

According to the second aspect, for example, the first communications device may be a base station, a relay, or a terminal. The second communications device may be a base station, a relay, or a terminal.

According to a third aspect, a communications device is provided and includes:

a processor, configured to generate first indication information; and a transceiver, configured to send the first indication information to a second communications device, where the first indication information indicates a frequency resource used by the second communications device to send data in a time unit and a frequency resource used by the second communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

In the foregoing solution, the communications device can flexibly allocate the frequency resources based on a network requirement, thereby improving resource utilization.

With reference to the third aspect, in a first possible implementation, the transceiver is further configured to send second indication information to the second communications device, where the second indication information indicates time domain information of the time unit.

With reference to the third aspect or the first possible implementation of the third aspect, in a second possible implementation, the first indication information indicates frequency domain location information of the frequency resource used to send data and frequency domain location information of the frequency resource used to receive data.

With reference to the second possible implementation of the third aspect, in a third possible implementation, the frequency domain location information includes at least one of the following information:

information about a lowest frequency of the frequency resource used to send data, information about a lowest frequency of the frequency resource used to receive data, information about a highest frequency of the frequency resource used to send data, and information about a highest frequency of the frequency resource used to receive data.

With reference to the third aspect or the first possible implementation of the third aspect, in a fourth possible implementation, the first indication information indicates bandwidth of the frequency resource used to send data or bandwidth of the frequency resource used to receive data.

With reference to the third aspect or the first possible implementation of the third aspect, in a fifth possible implementation, the first indication information indicates a ratio of bandwidth of the frequency resource used to send data to bandwidth of the frequency resource used to receive data.

With reference to any one of the third aspect or the possible implementations of the third aspect, in a sixth possible implementation, the frequency band includes a guard band.

With reference to the sixth possible implementation of the third aspect, in a seventh possible implementation, the transceiver is further configured to send third indication information to the second communications device, where the third indication information includes information about a frequency domain unit of the guard band, and the frequency domain unit is a subcarrier, a resource block RB, a resource block group RBG, an RB set, an RBG set, or a component carrier CC.

According to the third aspect, for example, the first communications device may be a base station, a relay, or a terminal. The second communications device may be a base station, a relay, or a terminal.

According to a fourth aspect, an information communications device is provided and includes:

a transceiver, configured to receive first indication information from a second communications device, where the first indication information indicates a frequency resource used by the communications device to send data in a time unit and a frequency resource used by the communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain; and a processor, configured to determine, based on the first indication information, the frequency resource used to send data and the frequency resource used to receive data.

In the foregoing solution, the second communications device can flexibly allocate the frequency resources based on a network requirement, thereby improving resource utilization.

With reference to the fourth aspect, in a first possible implementation, the transceiver is further configured to receive second indication information from the second communications device, where the second indication information indicates time domain information of the time unit.

With reference to the fourth aspect or the first possible implementation of the fourth aspect, in a second possible implementation, the first indication information indicates frequency domain location information of the frequency resource used to send data and frequency domain location information of the frequency resource used to receive data.

With reference to the second possible implementation of the fourth aspect, in a third possible implementation, the frequency domain location information includes at least one of the following information:

information about a lowest frequency of the frequency resource used to send data, information about a lowest frequency of the frequency resource used to receive data, information about a highest frequency of the frequency resource used to send data, and information about a highest frequency of the frequency resource used to receive data.

With reference to the fourth aspect or the first possible implementation of the fourth aspect, in a fourth possible implementation, the first indication information indicates bandwidth of the frequency resource used to send data or bandwidth of the frequency resource used to receive data.

With reference to the fourth aspect or the first possible implementation of the fourth aspect, in a fifth possible implementation, the first indication information indicates a ratio of bandwidth of the frequency resource used to send data to bandwidth of the frequency resource used to receive data.

With reference to any one of the fourth aspect or the possible implementations of the fourth aspect, in a sixth possible implementation, the frequency band includes a guard band.

With reference to the sixth possible implementation of the fourth aspect, in a seventh possible implementation, the transceiver is further configured to receive third indication information from the second communications device, where the third indication information includes information about a frequency domain unit of the guard band, and the frequency domain unit is a subcarrier, a resource block RB, a resource block group RBG, an RB set, an RBG set, or a component carrier CC.

According to the fourth aspect, for example, the first communications device may be a base station, a relay, or a terminal. The second communications device may be a base station, a relay, or a terminal.

In a possible design, a network device provided in this application may include a corresponding module configured to perform behavior of the network device in the foregoing method design. The module may be software and/or hardware.

In a possible design, a terminal provided in this application may include a corresponding module configured to perform behavior of the terminal in the foregoing method design. The module may be software and/or hardware.

According to another aspect of this application, a computer readable storage medium is provided. The computer readable storage medium stores an instruction. When the instruction is run on a computer, the computer performs the methods in the foregoing aspects.

According to another aspect of this application, a computer program product including an instruction is provided. When the instruction is run on a computer, the computer performs the methods in the foregoing aspects.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

With reference to the accompanying drawings, the following describes in detail embodiments provided in the present invention. A network architecture and a service scenario described in the embodiments of the present invention are intended to describe technical solutions in the embodiments of the present invention more clearly, but do not constitute a limitation on the technical solutions provided in the embodiments of the present invention. A person of ordinary skill in the art may know that the technical solutions provided in the embodiments of the present invention are also applicable to similar technical problems as the network architecture evolves and a new service scenario appears.

For ease of understanding, some terms involved in this application are described below.

Figure 1:
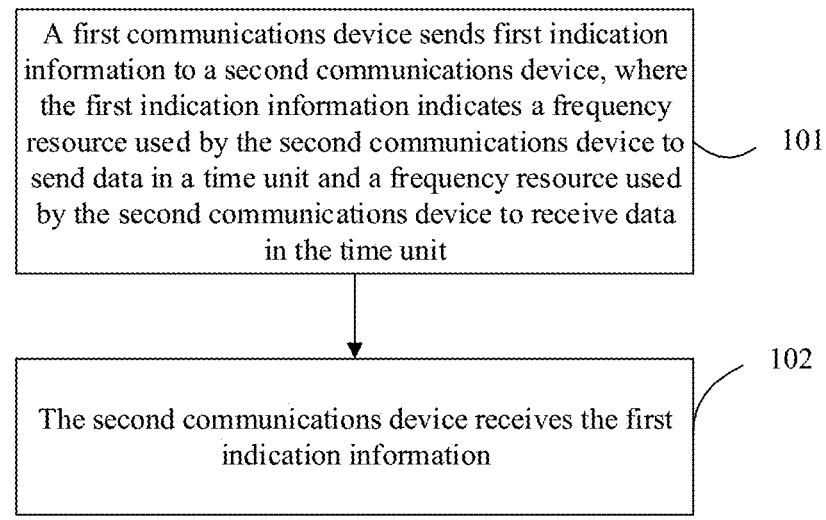
FIG. 1 is a flowchart of an information transmission method according to an embodiment of the present invention.

In this application, terms "network" and "system" are usually interchangeably used, but meanings of the terms may be understood by a person skilled in the art. User equipment (English: User Equipment, UE for short) is a terminal device having a communication function, may also be referred to as a terminal, and may include a handheld device, in-vehicle device, wearable device, or computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are briefly referred to as user equipment UE or a terminal. A network device may be a base station (base station, BS for short), a radio access device in a cloud network, or a device having a wireless receiving/transmitting function such as a relay station. The base station may also be referred to as a base station device, and is a device deployed in a radio access network to provide a wireless communication function. The base station may have different names in different radio access systems. For example, the base station is referred to as a NodeB (NodeB) in a universal mobile telecommunications system (Universal Mobile Telecommunications System, UMTS for short) network, the base station is referred to as an evolved NodeB (evolved NodeB, eNB or eNodeB for short) in an LTE network, and the base station may be referred to as a transmission reception point (Transmission Reception Point, TRP), a network node, or a g-NodeB (g-Node, gNB) in a future 5G system As shown in FIG. 1, an embodiment of the present invention provides an information transmission method, including the following steps:

Step 101: A first communications device sends first indication information to a second communications device, where the first indication information indicates a frequency resource used by the second communications device to send data in a time unit and a frequency resource used by the second communications device to receive data in the time unit.

The frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

Step 102: The second communications device receives the first indication information.

In the foregoing information transmission method, the first communications device can flexibly allocate the frequency resources based on a network requirement, thereby improving resource utilization. In addition, the first communications device dynamically allocates the frequency resources, so that better network coverage or a shorter transmission delay can be achieved.

The following further describes the foregoing method by using an example with reference to two scenarios.

Figure 2:
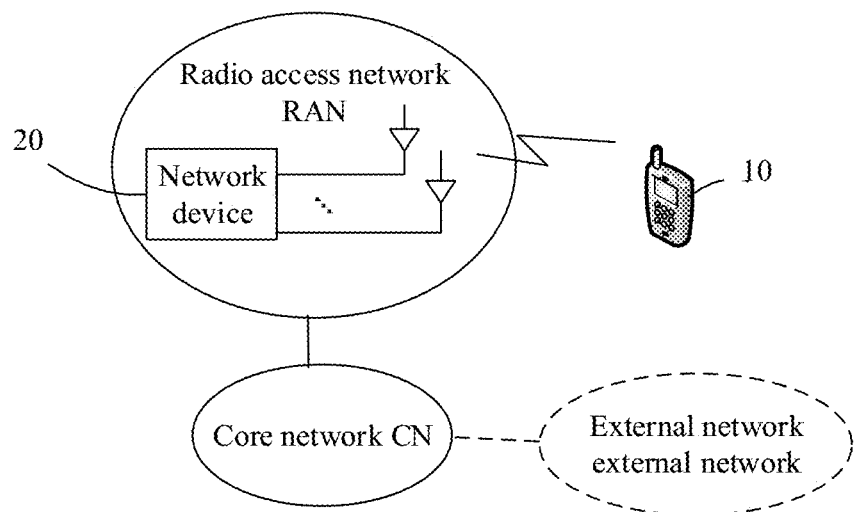
FIG. 2 is a schematic structural diagram of a possible system according to an embodiment of the present invention.

FIG. 2 is a schematic diagram of a possible system network in this application. As shown in FIG. 2, at least one terminal 10 communicates with a radio access network (Radio access network, RAN for short). The RAN includes at least one network device 20. For clarity, only one network device and one user equipment UE are shown in the figure. The RAN is connected to a core network (core network, CN for short). Optionally, the CN may be coupled to one or more external networks (External Network) such as the Internet and a public switched telephone network (public switched telephone network, PSTN for short).

Figure 3:
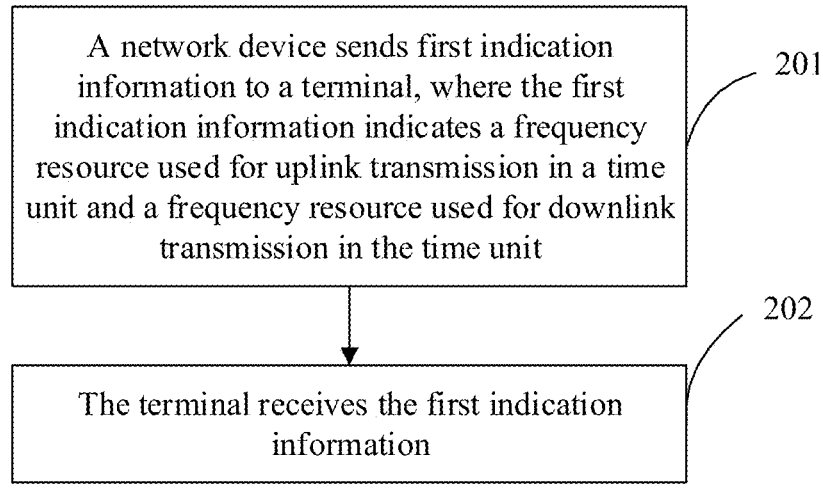
FIG. 3 is a flowchart of another information transmission method according to an embodiment of the present invention.

An embodiment of the present invention provides an information transmission method. The method may be applied to the system shown in FIG. 2. An example in which a network device and a terminal implement the method is used below for description. As shown in FIG. 3, the method includes the following steps.

Step 201: The network device sends first indication information to the terminal, where the first indication information indicates a frequency resource used for uplink transmission in a time unit and a frequency resource used for downlink transmission in the time unit.

The frequency resource used for uplink transmission and the frequency resource used for downlink transmission belong to a same frequency band, the frequency resource used for uplink transmission and the frequency resource used for downlink transmission are differentiated based on frequencies in the time unit, and the frequency band is a segment of continuous frequency resources in frequency domain.

Optionally, the time unit may be one or more frames (frame), subframes (subframe), slots (slot), mini-slots (mini-slot), orthogonal frequency division multiplexing (orthogonal frequency division multiplexing, OFDM) symbols, or the like. Alternatively, the time unit may be a combination of a frame, a subframe, a slot, a mini-slot, and an OFDM symbol.

Optionally, the frequency band may be an operating band (operating band), a transmission band that may be used by a base station, or a segment of preset continuous frequency resources.

Step 202: The terminal receives the first indication information.

In this embodiment of the present invention, the network device may generate the first indication information before sending the first indication information. Optionally, after receiving the first indication information, the terminal determines uplink and downlink frequency resources, and transmits data by using the uplink and downlink frequency resources. The data may be control plane data, user plane data, or a reference signal. For example, a channel sounding reference signal (sounding reference signal, SRS), a channel state information-reference signal (channel state information-reference signal, CSI-RS), a physical downlink shared channel (physical downlink shared channel, PDSCH), a physical uplink shared channel (physical uplink shared channel, PUSCH), a physical uplink control channel (physical uplink control channel, PUCCH), a physical broadcast channel (physical broadcast channel, PBCH), or the like is transmitted by using the indicated frequency resources.

In the foregoing information transmission method, the network device can flexibly allocate the uplink and downlink frequency resources based on a network requirement, thereby improving resource utilization. In addition, the network device dynamically allocates the uplink and downlink resources, so that better network coverage or a shorter transmission delay can be achieved.

In this embodiment of the present invention, the network device may be a base station, a relay, or another communications device.

Optionally, a part of the frequency band may be preset, for example, a part is fixedly used for uplink or downlink, and other parts are dynamically allocated.

Optionally, the first indication information may be carried by using higher layer signaling, for example, radio resource control (radio resource control, RRC) signaling, a master information block (Master Information Block, MIB), or a system information block (System Information Block, SIB); or may be carried by using a MAC control element (MAC control element, MAC CE); or may be carried by using downlink control information (downlink control information, DCI) or a scrambling code of DCI.

Figure 4:
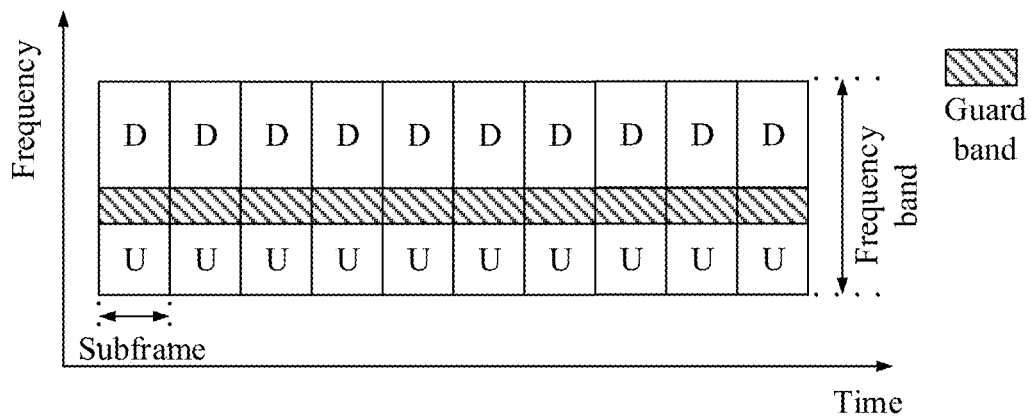
FIG. 4 is a schematic diagram of frequency resource allocation according to an embodiment of the present invention.

For example, the uplink and downlink frequency resources indicated by the first indication information may be shown in FIG. 4. In FIG. 4, "D" represents the frequency resource used for downlink transmission (briefly referred to as a downlink frequency resource), and "U" represents the frequency resource used for uplink transmission (briefly referred to as an uplink frequency resource). The first indication information may indicate uplink and downlink frequency resources in only one subframe, or may indicate uplink and downlink frequency resources in a plurality of subframes or in one frame. Optionally, the frequency band may further include a guard band, and the guard band is located between the uplink and downlink frequency resources.

Figure 5:
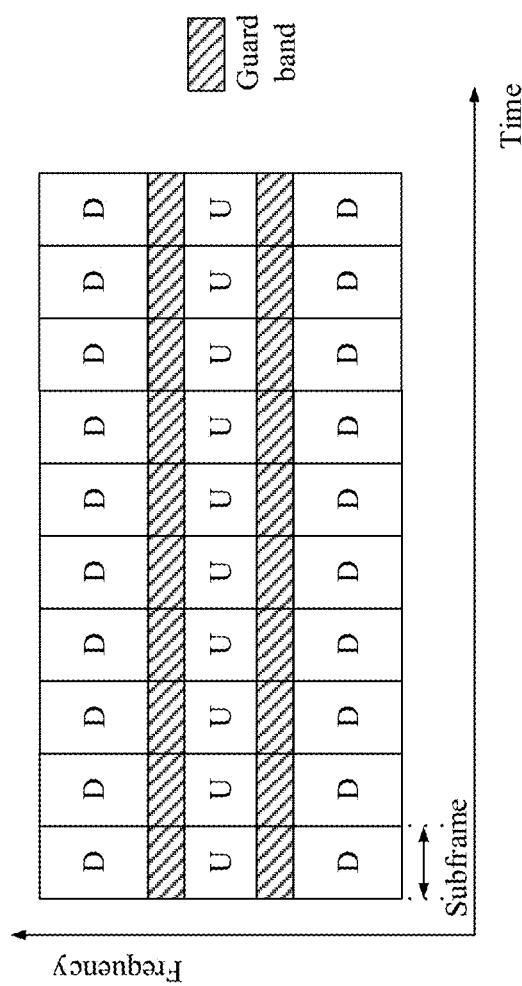
FIG. 5 is a schematic diagram of other frequency resource allocation according to an embodiment of the present invention.

For another example, the uplink and downlink frequency resources indicated by the first indication information may be shown in FIG. 5. There may be a plurality of segments of downlink frequency resources or downlink frequency resources, and there may be a guard band between the uplink and downlink frequency resources.

Figure 6:
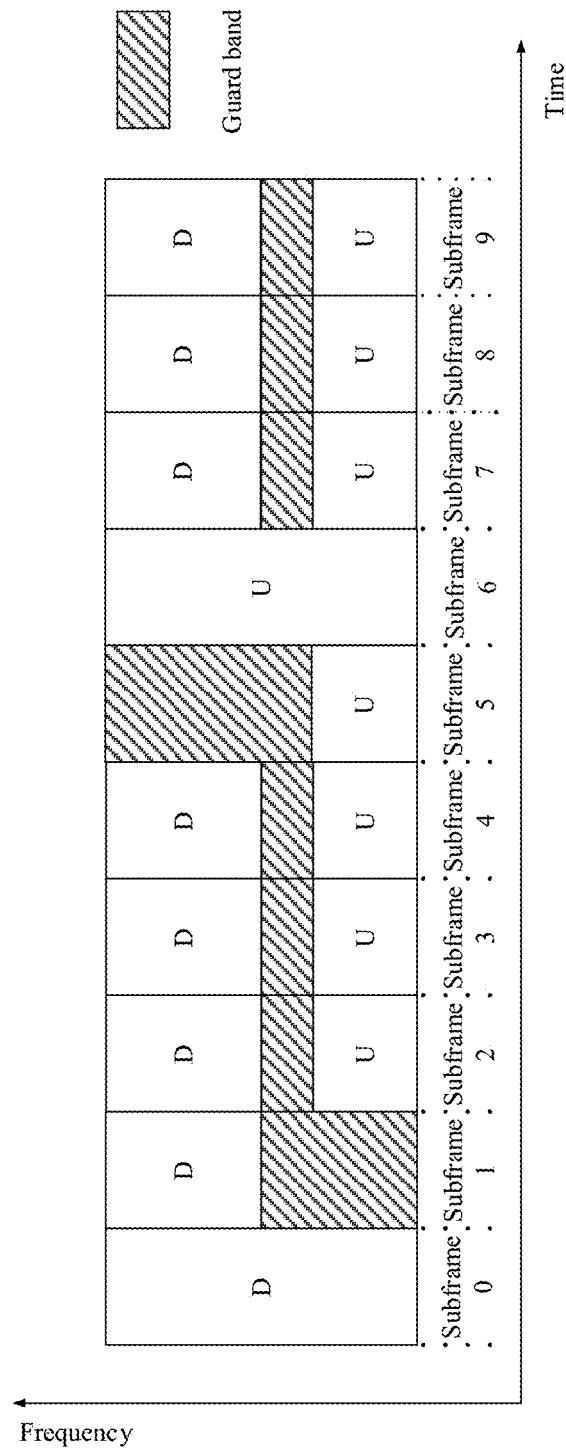
FIG. 6 is a schematic diagram of other frequency resource allocation according to an embodiment of the present invention.

For another example, allocation of the uplink and downlink frequency resources may be shown in FIG. 6. The first indication information may indicate uplink and downlink frequency resources in a subframe 2, a subframe 3, a subframe 4, a subframe 7, a subframe 8, and a subframe 9. Some subframes may be used for uplink or downlink only. For example, a subframe 0 is used for downlink only, and a subframe 6 is used for uplink only. Allocation of frequencies in these subframes may be indicated by other indication information or preset. Some subframes are used for uplink or downlink, and in addition, include a guard band, for example, a subframe 1 and a subframe 5. The guard band may be located at one end of a frequency band, for example, for the subframe 1 or the subframe 5. The guard band may also be located between uplink and downlink frequency resources, for example, for the subframes 2 to 4. Some subframes may also include no guard band, for example, the subframe 0 or the subframe 6. In this example, frequency resources in different subframes can be dynamically allocated, thereby improving frequency resource use flexibility and utilization. Optionally, the network device may indicate allocation of a frequency resource in one frame by using the first indication information.

In the foregoing example, the allocation of the frequency resource is described by using an example in which one frame includes 10 subframes and each subframe is used as a time unit. The time unit may also be a frame (frame), a slot (slot), a mini-slot (mini-slot), an OFDM symbol, or the like. Correspondingly, a frequency resource in a time unit may be allocated in a similar manner.

Figure 7:
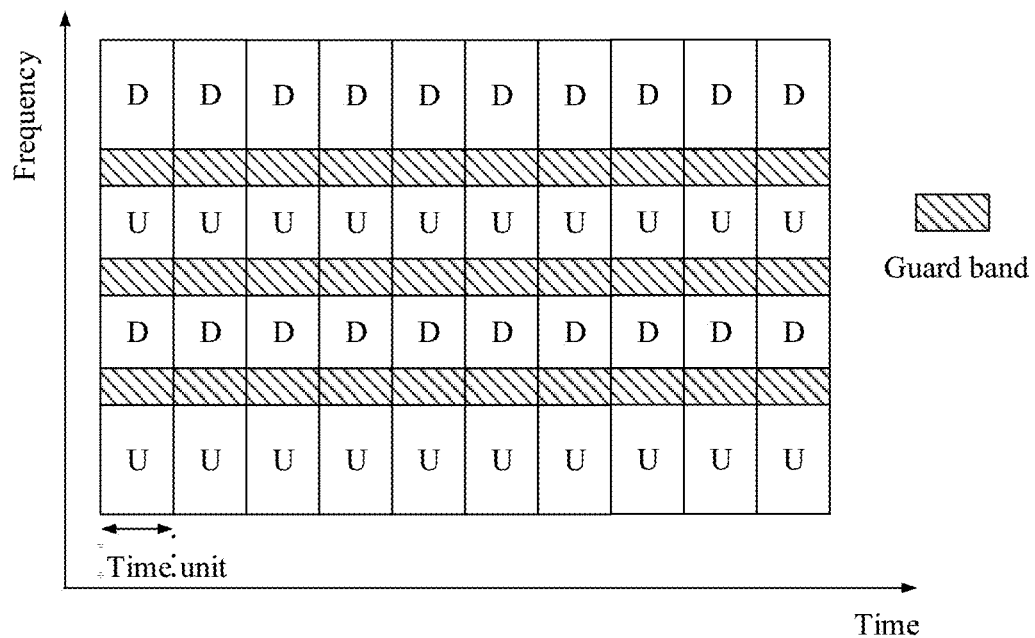
FIG. 7 is a schematic diagram of other frequency resource allocation according to an embodiment of the present invention.

For another example, the uplink and downlink frequency resources indicated by the first indication information may be shown in FIG. 7. There may be a plurality of segments of uplink and downlink frequency resources, and there may be a guard band between the uplink and downlink frequency resources.

Figure 8:
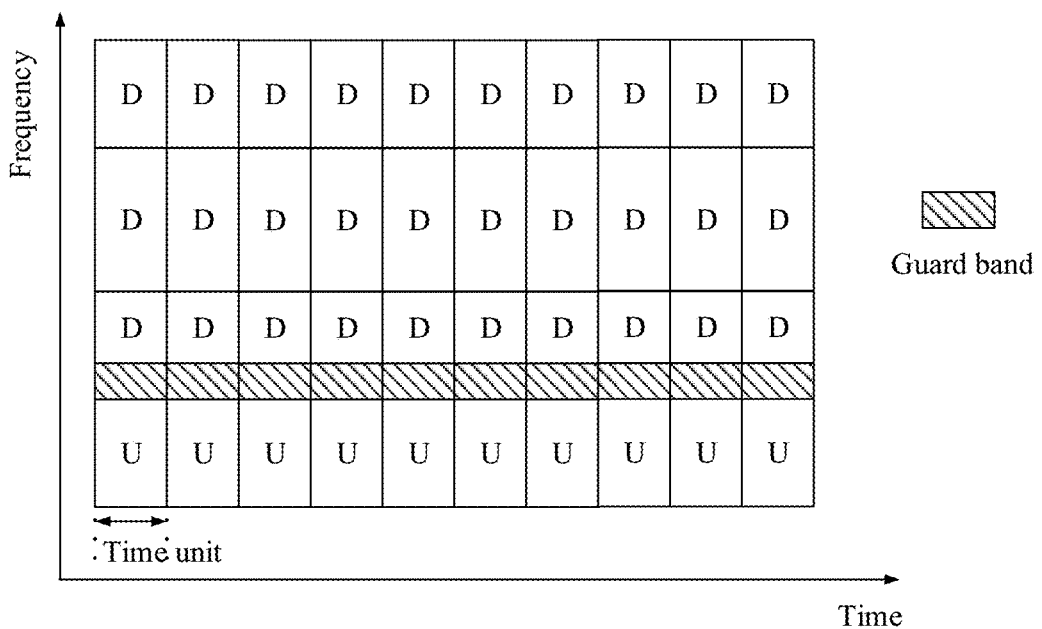
FIG. 8 is a schematic diagram of other frequency resource allocation according to an embodiment of the present invention.

For another example, the uplink and downlink frequency resources indicated by the first indication information may be shown in FIG. 8. There may be a plurality of segments of downlink frequency resources, and there may be a guard band between the uplink and downlink frequency resources. Each downlink frequency resource may be used as a component carrier (Component Carrier, CC).

Figure 9:
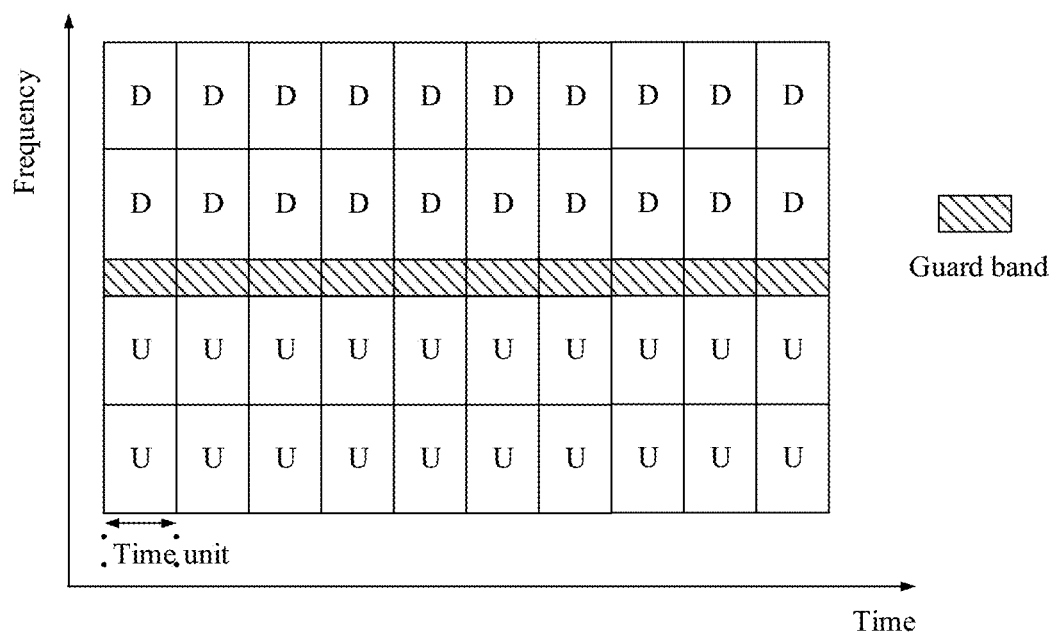
FIG. 9 is a schematic diagram of other frequency resource allocation according to an embodiment of the present invention.

For another example, the uplink and downlink frequency resources indicated by the first indication information may be shown in FIG. 9.

Optionally, the method further includes: sending, by the network device, second indication information, where the second indication information is used to identify time domain information of the time unit. For example, the second indication information may carry an index of the time unit; or the second indication information may carry a quantity of time units; or a set of a plurality of time units is preset, and the second indication information carries an index of the set.

Optionally, the second indication information may be carried by using higher layer signaling, and the first indication information may be carried by using a MAC CE or DCI or a scrambling code of DCI.

In this embodiment of the present invention, a location relationship between the uplink and downlink frequency resources and bandwidth of the guard band are preset or indicated by the network device. The bandwidth of the guard band may change with different information transmitted on the uplink and downlink frequency resources.

In this embodiment of the present invention, the first indication information may indicate the uplink and downlink resources in a plurality of manners. An example is used below for description.

Example 1

The location relationship between the uplink and downlink resources and the bandwidth of the guard band are preset or indicated by the network device. The first indication information may indicate frequency domain location information of the uplink and downlink resources. For example, as shown in FIG. 4, the downlink frequency resource is located in a higher frequency band, and the uplink frequency resource is located in a lower frequency band. In this case, after the first indication information indicates only a lowest frequency of the downlink frequency resource or a highest frequency of the uplink frequency resource, the terminal can determine the uplink and downlink frequency resources based on a preset relationship. Alternatively, the uplink frequency resource is located in a higher frequency band, and the downlink frequency resource is located in a lower frequency band. In this case, after the first indication information indicates only a lowest frequency of the uplink frequency resource or a highest frequency of the downlink frequency resource, the terminal can determine the uplink and downlink frequency resources based on a preset relationship.

The first indication information may carry a frequency value, or may carry, for example, an E-UTRA absolute radio frequency channel number (E-UTRA Absolute Radio Frequency Channel Number, EARFCN) in evolved universal terrestrial radio access (evolved universal terrestrial radio access, E-UTRA).

For example, referring to Table 1, the network device may configure the lowest frequency of the uplink frequency resource, that is, $$F_{UL}=F_{UL\_low}+0.1(N_{UL}-N_{Offs-UL})$$

The network device may configure the highest frequency of the downlink frequency resource, that is, $$F_{DL}=F_{DL\_up}-0.1(N_{DL}-N_{Offs-DL\_up})$$

$N_{UL}$ and/or $N_{DL}$ are/is a dynamic configuration value, may be an absolute radio frequency channel number, and are/is carried in the first indication information. $F_{DL\_low}/F_{UL\_low}$ is a lowest frequency of a downlink/uplink operating band. $N_{Offs-DL}/N_{Offs-UL}$ is an absolute radio frequency channel number offset, and is related to a corresponding operating band.

TABLE 1

| E-UTRA operating band (E-UTRA Operating Band) | Downlink (Downlink) | | Uplink (Uplink) | | |
|---|---|---|---|---|---|
| | $F_{DL\_low}$ (MHz) | $N_{Offs-DL}$ | Range of $N_{DL}$ (Range of $N_{DL}$) | $F_{UL\_low}$ (MHz) | $N_{Offs-UL}$ | Range of $N_{UL}$ (Range of $N_{UL}$) |
| 1 | 2110 | 0 | 0 to 599 | 1920 | 18000 | 18000 to 18599 |
| 2 | 1930 | 600 | 600 to 1199 | 1850 | 18600 | 18600 to 19199 |
| 3 | 1805 | 1200 | 1200 to 1949 | 1710 | 19200 | 19200 to 19949 |
| 4 | 2110 | 1950 | 1950 to 2399 | 1710 | 19950 | 19950 to 20399 |
| 5 | 869 | 2400 | 2400 to 2649 | 824 | 20400 | 20400 to 20649 |
| 6 | 875 | 2650 | 2650 to 2749 | 830 | 20650 | 20650 to 20749 |
| 7 | 2620 | 2750 | 2750 to 3449 | 2500 | 20750 | 20750 to 21449 |
| 8 | 925 | 3450 | 3450 to 3799 | 880 | 21450 | 21450 to 21799 |
| 9 | 1844.9 | 3800 | 3800 to 4149 | 1749.9 | 21800 | 21800 to 22149 |
| 10 | 2110 | 4150 | 4150 to 4749 | 1710 | 22150 | 22150 to 22749 |
| 11 | 1475.9 | 4750 | 4750 to 4949 | 1427.9 | 22750 | 22750 to 22949 |
| 12 | 729 | 5010 | 5010 to 5179 | 699 | 23010 | 23010 to 23179 |
| 13 | 746 | 5180 | 5180 to 5279 | 777 | 23180 | 23180 to 23279 |
| ... | | | | | | |

The frequency domain location information may also be information about a center frequency of the uplink or downlink frequency resource or information about a frequency location offset.

Example 2

The location relationship between the uplink and downlink resources and the bandwidth of the guard band are preset or indicated by the network device. The first indication information indicates bandwidth of the uplink frequency resource or bandwidth of the downlink frequency resource. The bandwidth may be a quantity of component carriers (Component Carrier, CC), a quantity of resource blocks (Resource Block, RB), a quantity of resource block groups (Resource Block Group, RBG), a quantity of RB sets, a quantity of RBG sets, or the like.

Example 3

The location relationship between the uplink and downlink resources and the bandwidth of the guard band are preset or indicated by the network device. The first indication information indicates a ratio of bandwidth of the uplink frequency resource to bandwidth of the downlink frequency resource.

Example 4

The first indication information indicates information about a frequency domain unit of the uplink frequency resource or information about a frequency domain unit of the downlink frequency resource, for example, an index of the frequency domain unit. Alternatively, a set of frequency domain units is preset, and the first indication information carries an index of a frequency domain unit in the set. The frequency domain unit may be a subcarrier, a resource block RB, a resource block group RBG, an RB set, an RBG set, a component carrier CC, or the like.

Example 5

Figure 10:
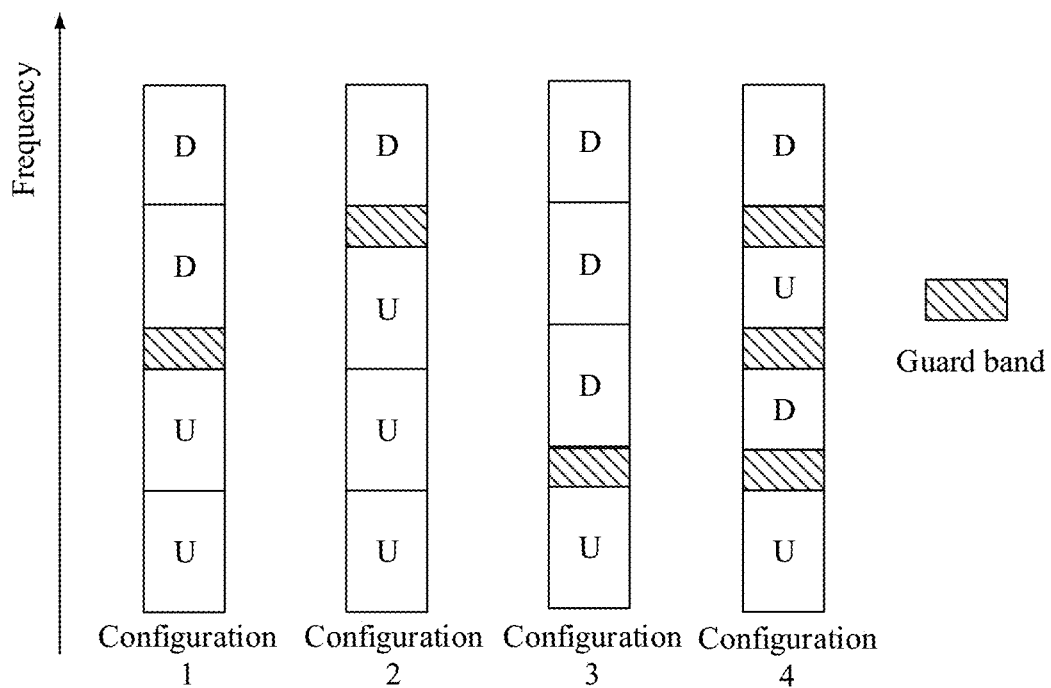
FIG. 10 is a schematic diagram of a frequency resource configuration according to an embodiment of the present invention.

A plurality of configurations may be preset for allocation of the uplink and downlink frequency resources and allocation of the guard band, for example, four frequency resource configurations shown in FIG. 10. After the first indication information indicates information about a configuration, for example, an index of the configuration, the terminal can determine the allocation of the frequency resources based on the index.

Example 6

Figure 11:
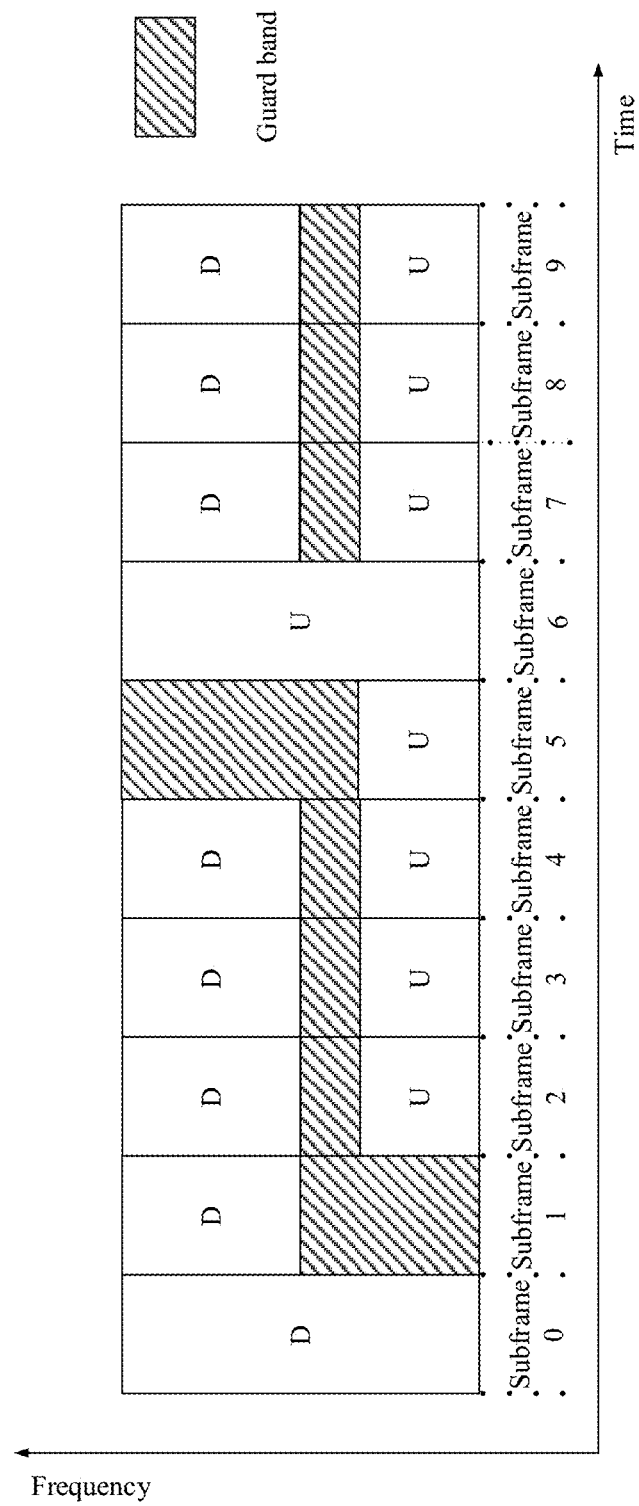
FIG. 11 is a schematic diagram of a frequency resource allocation type according to an embodiment of the present invention.
Figure 12:
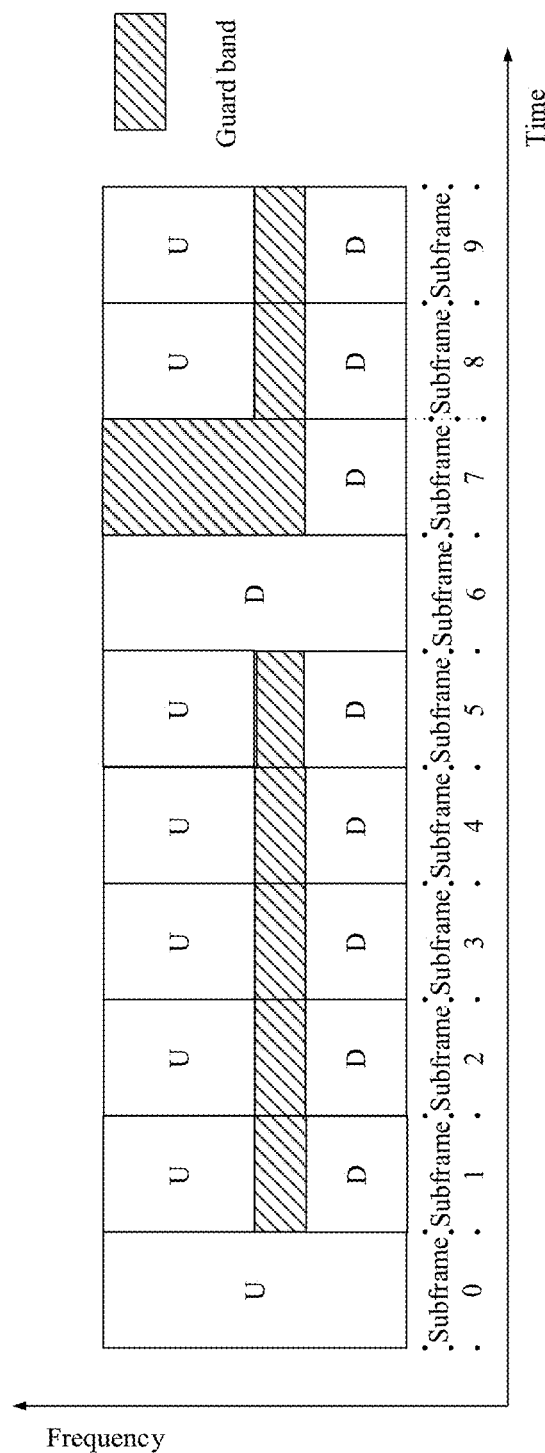
FIG. 12 is a schematic diagram of another frequency resource allocation type according to an embodiment of the present invention.

A plurality of types may be preset for allocation of the uplink frequency resource and allocation of the guard band. For example, FIG. 11 shows a type 1: If a downlink frequency resource exists in a subframe, the downlink frequency resource is located at a location at which a frequency of the downlink frequency resource is higher than a frequency of the uplink frequency resource. FIG. 12 shows a type 2: If an uplink frequency resource exists in a subframe, the uplink frequency resource is located at a location at which a frequency of the uplink frequency resource is higher than a frequency of the downlink frequency resource frequency. After the first indication information indicates a type, the terminal can determine the allocation of the frequency resources based on the type and other preset information.

In this embodiment of the present invention, optionally, the network device may send third indication information to the terminal. The third indication information includes information about a frequency domain unit of the guard band, and the frequency domain unit is a subcarrier, a resource block RB, a resource block group RBG, an RB set, an RBG set, or a component carrier CC.

Figure 13:
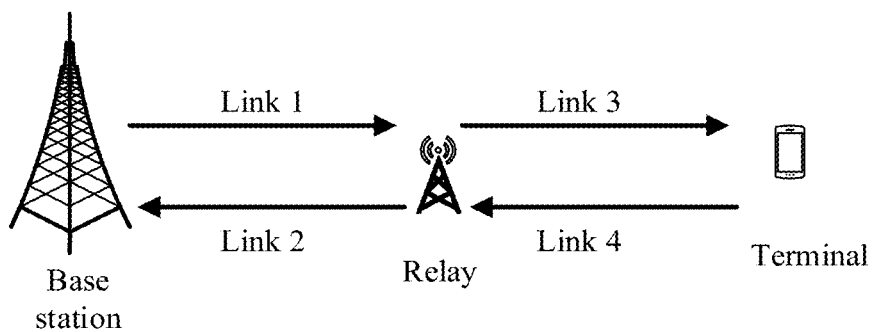
FIG. 13 is a schematic structural diagram of another possible system according to an embodiment of the present invention.

In the foregoing embodiment, the information transmission method is described by using the network device and the terminal as examples. The foregoing solution may also be applied to a scenario in which a relay exists in a network. As shown in FIG. 13, communication between a base station and a terminal requires assistance from a relay. The base station may use the method in the foregoing embodiment to indicate a frequency resource used by the relay. Specific implementation methods and technical details are similar to those in the foregoing embodiment, and are merely briefly described below. For other technical details, refer to the foregoing embodiment.

Figure 14:
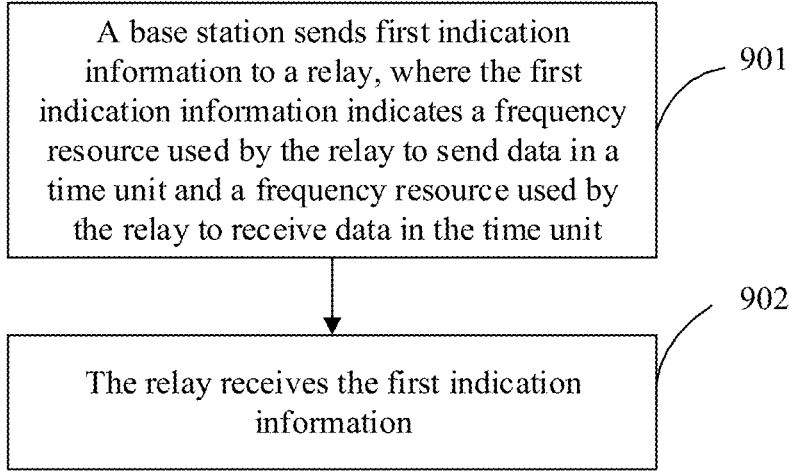
FIG. 14 is a flowchart of another information transmission method according to an embodiment of the present invention.

As shown in FIG. 14, another embodiment of the present invention provides an information transmission method, including the following steps:

Step 901: A base station sends first indication information to a relay, where the first indication information indicates a frequency resource used by the relay to send data in a time unit and a frequency resource used by the relay to receive data in the time unit.

The frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

Step 902: The relay receives the first indication information.

Optionally, after receiving the first indication information, the relay determines the frequency resource used to send data and the frequency resource used to receive data, and may subsequently transmit data by using the frequency resources.

Transmitting the data may be transmitting control plane data, user plane data, or a reference signal.

In the foregoing information transmission method, the base station can flexibly allocate the frequency resources to the relay based on a network requirement, thereby improving resource utilization. In addition, the base station dynamically allocates the frequency resources, so that better network coverage or a shorter transmission delay can be achieved.

In this embodiment of the present invention, there are a total of four links used by the relay to send or receive data, namely, a link 1, a link 2, a link 3, and a link 4 in FIG. 13. The link 1 and the link 2 may be referred to as backhaul links, and the link 3 and the link 4 may be referred to as access links. The frequency resource used to send data and the frequency resource used to receive data may be frequency resources of a combination of the following links: the link 1 and the link 2; the link 3 and the link 4; the link 1 and the link 3; the link 1 and the link 3; and the link 2 and the link 4.

In this embodiment of the present invention, optionally, frequency resources used by the link 1 and the link 4 may be differentiated based on frequencies; and frequency resources used by the link 2 and the link 3 may be differentiated based on frequencies.

Optionally, the frequency band may not include a guard band.

Optionally, the method further includes: sending, by the base station, second indication information to the relay, where the second indication information is used to identify time domain information of the time unit.

Optionally, the base station may send third indication information to the relay, where the third indication information includes information about a frequency domain unit of the guard band.

In this embodiment, for technical details about a method for allocating and indicating the frequency resource used by the relay to send data and the frequency resource used by the relay to receive data or the like, refer to the method for allocating and indicating the uplink and downlink frequency resources in the foregoing embodiment. Details are not described herein again.

In this embodiment, the relay may also be a base station, a terminal, or another communications device having a relay function.

This embodiment of the present invention further provides a structure of a frame, and frequency resources in the frame may be dynamically allocated. For example, allocation of the frequency resources shown in FIG. 4 to FIG. 12 may be considered as allocation of frequency resources in one frame.

The embodiments of the present invention further provide an apparatus embodiment for implementing steps and methods in the method embodiments. The methods, steps, technical details, technical effects, and the like in the method embodiments are also applicable to the apparatus embodiment, and details are not described below again.

Figure 15:
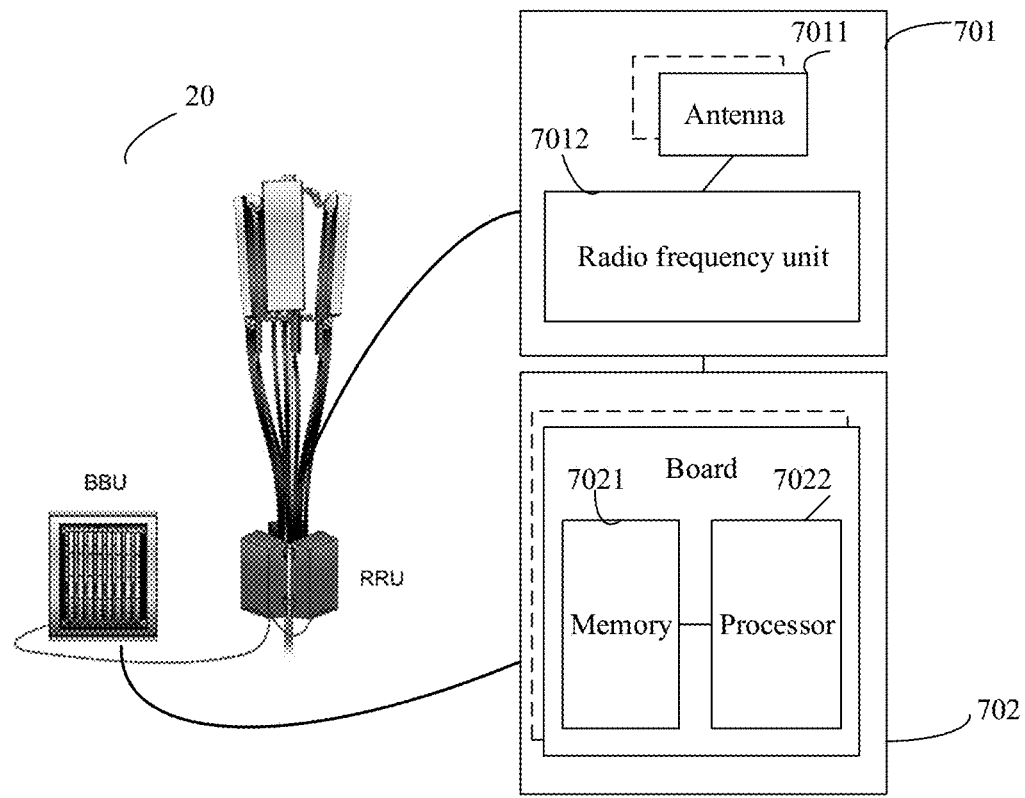
FIG. 15 is a schematic structural diagram of a possible network device according to an embodiment of the present invention.

FIG. 15 is a schematic structural diagram of a network device. The network device may be applied to the system shown in FIG. 2 or FIG. 13. The network device 20 includes one or more remote radio units (remote radio unit, RRU) 701 and one or more baseband units (baseband unit, BBU) 702. The RRU 701 may be referred to as a transceiver unit, a transceiver, a transceiver circuit, a transceiver, or the like, and may include at least one antenna 7011 and a radio frequency unit 7012. The RRU 701 is mainly configured to: receive/transmit a radio frequency signal, and perform conversion between the radio frequency signal and a baseband signal, for example, configured to send a signaling indication or the reference signal in the foregoing embodiment to a terminal. The BBU 702 is mainly configured to: perform baseband processing, control the network device, and the like. The RRU 701 and the BBU 702 may be physically disposed together, or may be physically separated, namely, a distributed base station.

The BBU 702 is a control center of the network device, or may be referred to as a processing unit, and is mainly configured to complete baseband processing functions such as channel coding, multiplexing, modulation, and spectrum spreading. In an example, the BBU 702 may include one or more boards, and a plurality of boards may jointly support a radio access network (such as a 5G network) in a single access standard, or may separately support radio access networks in different access standards. The BBU 702 further includes a memory 7021 and a processor 7022. The memory 7021 is configured to store necessary instructions and data. The processor 7022 is configured to control the network device to perform a necessary action. The memory 7021 and the processor 7022 may serve the one or more boards. In other words, a memory and a processor may be separately disposed on each board. Alternatively, the plurality of boards may share a same memory and processor. In addition, a necessary circuit is further disposed on each board.

The network device may be configured to implement the method in the foregoing method embodiment. Specifically, communication between the network device and a second communications device (for example, a terminal or a relay) is used as an example for description.

A network device includes:

a processor, configured to generate first indication information; and a transceiver, configured to send the first indication information to a second communications device, where the first indication information indicates a frequency resource used by the second communications device to send data in a time unit and a frequency resource used by the second communications device to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain.

Optionally, the transceiver is further configured to send second indication information to the second communications device, where the second indication information indicates time domain information of the time unit.

Optionally, the transceiver is further configured to send third indication information to the second communications device, where the third indication information includes information about a frequency domain unit of the guard band, and the frequency domain unit is a subcarrier, a resource block RB, a resource block group RBG, an RB set, an RBG set, or a component carrier CC.

Figure 16:
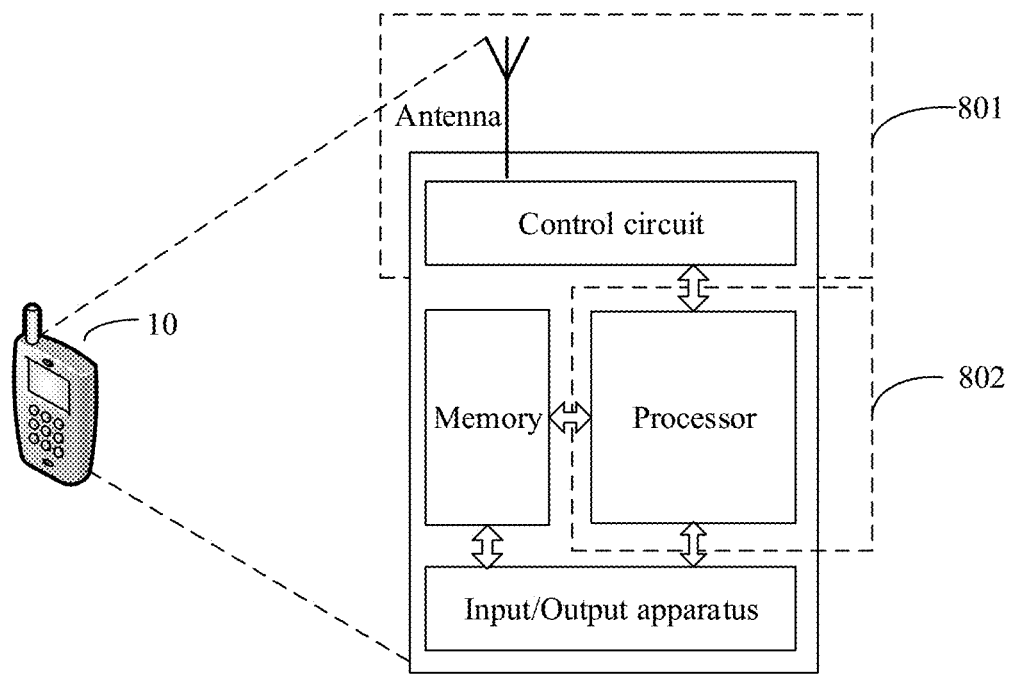
FIG. 16 is a schematic structural diagram of a possible terminal according to an embodiment of the present invention.

FIG. 16 is a schematic structural diagram of a terminal. The terminal is applicable to the system shown in FIG. 2 or FIG. 13. For ease of description, FIG. 16 shows only main components of the terminal. As shown in FIG. 16, the terminal 10 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and data, for example, store a codebook described in the foregoing embodiment. The control circuit is mainly configured to: perform conversion between a baseband signal and a radio frequency signal and process the radio frequency signal. The control circuit together with the antenna may also be referred to as a transceiver that is mainly configured to receive/transmit a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program from the storage unit, interpret and execute an instruction of the software program, and process the data of the software program. When data needs to be sent in a wireless manner, the processor performs baseband processing on the to-be-sent data, and then outputs a baseband signal to a radio frequency circuit. After performing radio frequency processing on the baseband signal, the radio frequency circuit sends a radio frequency signal outwards by using the antenna in an electromagnetic wave form. When data is sent to the terminal, a radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 16 shows only one memory and one processor. Actually, the terminal may include a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. Functions of the baseband processor and the central processing unit are integrated into the processor in FIG. 16. A person skilled in the art may understand that the baseband processor and the central processing unit each may be an independent processor, and are interconnected by using technologies such as a bus. A person skilled in the art may understand that the terminal may include a plurality of baseband processors to adapt to different network standards, the terminal may include a plurality of central processing units to enhance a processing capability of the terminal, and all components of the terminal may be connected to each other by using various buses. The baseband processor may also be expressed as a baseband processing circuit or a baseband processing chip. The central processing unit may also be expressed as a central processing circuit or a central processing chip. A function of processing the communication protocol and the communication data may be built into the processor, or may be stored in the storage unit in a form of a software program, so that the processor executes the software program to implement a baseband processing function.

For example, in this embodiment of the present invention, the antenna and the control circuit that have a receiving/transmitting function may be considered as a transceiver unit 801 of the terminal 10, and the processor having a processing function may be considered as a processing unit 802 of the terminal 10. As shown in FIG. 16, the terminal 10 includes the transceiver unit 801 and the processing unit 802. The transceiver unit may also be referred to as a transceiver, a transceiver, a transceiver apparatus, or the like. Optionally, a component that is in the transceiver unit 801 and that is configured to implement a receiving function may be considered as a receiving unit, and a component that is in the transceiver unit 801 and that is configured to implement a sending function may be considered as a sending unit. In other words, the transceiver unit 801 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

The terminal may be configured to implement the method in the foregoing method embodiment. Specifically, communication between the terminal and a second communications device (for example, a base station or a relay) is used as an example for description.

A terminal includes:

a transceiver, configured to receive first indication information from a second communications device, where the first indication information indicates a frequency resource used by the terminal to send data in a time unit and a frequency resource used by the terminal to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain; and a processor, configured to determine, based on the first indication information, the frequency resource used to send data and the frequency resource used to receive data.

Optionally, the transceiver is further configured to receive second indication information from the second communications device, where the second indication information indicates time domain information of the time unit.

Optionally, the transceiver is further configured to receive third indication information from the second communications device, where the third indication information includes information about a frequency domain unit of the guard band, and the frequency domain unit is a subcarrier, a resource block RB, a resource block group RBG, an RB set, an RBG set, or a component carrier CC.

The relay may have a simplified structure or a similar structure of the network device or the terminal. The relay may implement the method in the foregoing method embodiment. Specifically, communication between the relay and a second communications device (for example, a base station) is used as an example for description.

A relay includes:

a transceiver, configured to receive first indication information from a second communications device, where the first indication information indicates a frequency resource used by the relay to send data in a time unit and a frequency resource used by the relay to receive data in the time unit, the frequency resource used to send data and the frequency resource used to receive data belong to a same frequency band, the frequency resource used to send data and the frequency resource used to receive data are differentiated based on frequencies in the time unit, and the frequency band is a segment of continuous frequency resources in frequency domain; and a processor, configured to determine, based on the first indication information, the frequency resource used to send data and the frequency resource used to receive data.

Optionally, the transceiver is further configured to receive second indication information from the second communications device, where the second indication information indicates time domain information of the time unit.

Optionally, the transceiver is further configured to receive third indication information from the second communications device, where the third indication information includes information about a frequency domain unit of the guard band, and the frequency domain unit is a subcarrier, a resource block RB, a resource block group RBG, an RB set, an RBG set, or a component carrier CC.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer readable storage medium or transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. An information transmission method, comprising:

receiving, by a first communications device, first indication information from a second communications device, wherein:
   the first indication information indicates a frequency resource used by the first communications device to send data in a time unit and a frequency resource used by the first communications device to receive data in the time unit,
   the frequency resource used to send data and the frequency resource used to receive data belong to a same frequency band,
   the frequency resource used to send data and the frequency resource used to receive data are differentiated based on frequencies in the time unit,
   the frequency band is a segment of continuous frequency resources in frequency domain,
   the first indication information indicates a ratio of a bandwidth of the frequency resource used to send data in the time unit to a bandwidth of the frequency resource used to receive data in the time unit,
   the first indication information indicates frequency domain location information of the frequency resource used to send data and frequency domain location information of the frequency resource used to receive data, and
   the frequency domain location information comprises at least one of:
      information indicating a lowest frequency of the frequency resource used to send data,
      information indicating a lowest frequency of the frequency resource used to receive data, or
      information indicating a highest frequency of the frequency resource used to receive data.

2. The method according to claim 1, wherein the method further comprises: receiving, by the first communications device, second indication information from the second communications device, wherein the second indication information indicates time domain information of the time unit.

3. The method according to claim 1, wherein the frequency domain location information comprises
   information indicating a highest frequency of the frequency resource used to send data.

4. The method according to claim 1, wherein the first indication information indicates the bandwidth of the frequency resource used to send data or the bandwidth of the frequency resource used to receive data.

5. A communications device, comprising:

at least one processor coupled to a non-transitory computer-readable storage medium storing programming instructions for execution by the at least one processor, wherein the programming instructions instruct the communications device to:
generate first indication information; and
send the first indication information to a second communications device, wherein:
   the first indication information indicates a frequency resource used by the second communications device to send data in a time unit and a frequency resource used by the second communications device to receive data in the time unit,
   the frequency resource used to send data and the frequency resource used to receive data belong to a same frequency band, the frequency resource used to send data and the frequency resource used to receive data are differentiated based on frequencies in the time unit, the frequency band is a segment of continuous frequency resources in frequency domain, the first indication information indicates a ratio of a bandwidth of the frequency resource used to send data in the time unit to a bandwidth of the frequency resource used to receive data in the time unit, the first indication information indicates frequency domain location information of the frequency resource used to send data and frequency domain location information of the frequency resource used to receive data, and the frequency domain location information comprises at least one of:

information indicating a lowest frequency of the frequency resource used to send data, information indicating a lowest frequency of the frequency resource used to receive data, or information indicating a highest frequency of the frequency resource used to receive data.

6. The communications device according to claim 5, wherein the programming instructions instruct the communications device to send second indication information to the second communications device, wherein the second indication information indicates time domain information of the time unit.

7. The communications device according to claim 5, wherein the frequency domain location information comprises information indicating a highest frequency of the frequency resource used to send data.

8. The communications device according to claim 5, wherein the first indication information indicates the bandwidth of the frequency resource used to send data or the bandwidth of the frequency resource used to receive data.

9. The communications device according to claim 5, wherein the frequency band comprises a guard band.

10. A communications device, comprising:

a transceiver; and at least one processor coupled to a non-transitory computer-readable storage medium storing programming instructions for execution by the at least one processor, wherein the programming instructions instruct the communications device to:

receive first indication information from a second communications device, wherein:

the first indication information indicates a frequency resource used by the communications device to send data in a time unit and a frequency resource used by the communications device to receive data in the time unit, the frequency resource used to send data and the frequency resource used to receive data belong to a same frequency band, the frequency resource used to send data and the frequency resource used to receive data are differentiated based on frequencies in the time unit, the frequency band is a segment of continuous frequency resources in frequency domain, the first indication information indicates a ratio of a bandwidth of the frequency resource used to send data in the time unit to a bandwidth of the frequency resource used to receive data in the time unit;

the first indication information indicates frequency domain location information of the frequency resource used to send data and frequency domain location information of the frequency resource used to receive data, and the frequency domain location information comprises at least one of:

information indicating a lowest frequency of the frequency resource used to send data, information indicating a lowest frequency of the frequency resource used to receive data, or information indicating a highest frequency of the frequency resource used to receive data; and determine, based on the first indication information, the frequency resource used to send data and the frequency resource used to receive data.

11. The communications device according to claim 10, wherein the programming instructions instruct the transceiver to receive second indication information from the second communications device, wherein the second indication information indicates time domain information of the time unit.

12. The communications device according to claim 10, wherein the frequency domain location information comprises information indicating a highest frequency of the frequency resource used to send data.

13. The communications device according to claim 10, wherein the first indication information indicates the bandwidth of the frequency resource used to send data or the bandwidth of the frequency resource used to receive data.

14. The communications device according to claim 10, wherein the frequency band comprises a guard band.

* * * * *